INVENTORS
PAUL BOSSARD
JEAN MONIE

United States Patent Office 3,428,841
Patented Feb. 18, 1969

3,428,841
SYNCHRONOUS ELECTRIC MOTOR
Paul Bossard and Jean Monie, Cluses, France, assignors to Etablissements Carpano and Pons, Cluses, France
Filed Mar. 16, 1966, Ser. No. 534,876
Claims priority, application France, Mar. 19, 1965, 9,922/65
U.S. Cl. 310—164                              1 Claim
Int. Cl. H02k 21/04

ABSTRACT OF THE DISCLOSURE

A small synchronous electric motor including a permanently magnetized rotor, a stator having an energizing coil surrounding the rotor, a cage of stator poles disposed between the rotor and the coil and projecting on either side along two flanges placed on either side of the coil and connected magnetically by a ring surrounding the coil and along the inner edge of a magnetizable ring independent of the flanges and placed between one of them and the coil, one pole of this flange and one pole of the magnetizable ring being each time placed side by side between two poles of the opposed flange, a short circuiting ring between the magnetizable ring and the flange near the ring, the distance between neighbouring poles of the same polarity being greater than the distance between the poles of opposed polarity, the diameter of the magnetizable inner ring being smaller than the diameter of the two flanges in such a way that the magnetic flux passing through the poles of the ring be less than that of the poles of the two flanges.

---

French Patent No. 1,166,984 describes another synchronous motor having stator flanges but whose poles are simultaneously directly energised by a dephased field in such a way that each flange is formed by two polar sheets of conventional form and by a short circuiting ring. In this motor, the poles are formed by partial stamping of tongues in the full sheets of the stators and by the folding of these tongues. The assembly of such a motor is complicated because the poles of each of four polar sheets must be disposed very exactly in a predetermined angular position during mounting of the different parts of the motor. There is also in this structure no complete regularity in the distribution of the poles. The assembly uses a plate with supplemental poles, which plate has a rather large diameter for a motor of its size and for a given couple is rather thick and heavy. Additionally this motor is not self-starting for all angular positions under load.

The motor according to the invention is characterized by two disc shaped polar identical sheets having poles formed by partial stamping and folding of tongues, the first sheet of which constitutes the first half of the stator and the second sheet the other half of the stator bearing poles energised by dephased field, a third annular polar sheet applied to one side of the coil and having other poles of the second half of the stator directed towards this coil, a short circuiting ring having openings permitting the passage of the poles of the second polar sheet and arranged between the second sheet and the third; through axial recesses provided in the inner face of the winding and intended for engaging beginning with an angular position of all the poles of the two halves of the stator, by bearings for the shaft of the rotor disposed in the center of the two outer polar sheets and finally by an annular housing of magnetisable material surrounding the coil and the winding and linking the two outer polar sheets.

The motor according to the invention thus comprises six stator members which are of simple and ready manufacture of which the two forming the outer polar sheets are identical; furthermore, the third polar sheet is such that its diameter is less than that of the other stator members so that the density and the distribution of the magnetic flux are particularly advantageous. The axial recesses provided in the lower wall of the coil provide the correct and automatic adjustment of the polar tongues of different sheets engaged therein in such a way that it is particularly easy to predetermine the direction of rotation of the motor by appropriately selecting the arrangement of the poles.

The invention will now be described with reference to the annexed drawings showing by way of non-limiting example one embodiment thereof:

Figure 1:
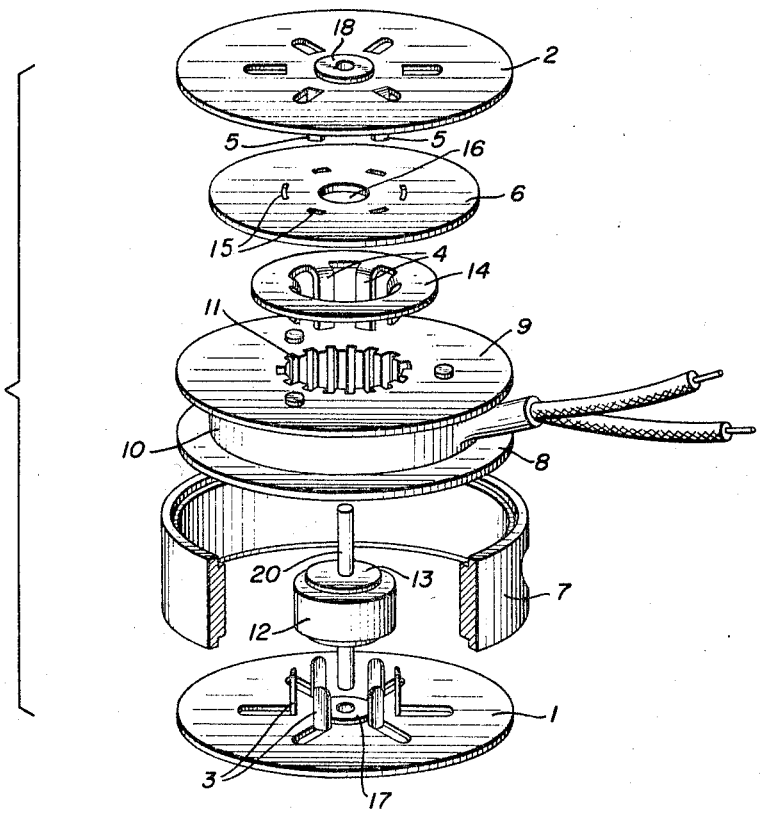
FIGURE 1 is an exploded view of the different parts of the motor.

As shown on FIGURE 1, the motor comprises two polar stator sheets 1 and 2 of the same shape having tongues 3 and 5 forming the stator poles; a disc 6 of non-magnetic conducting material, for example copper, forming a short circuiting ring and wherein is provided a central opening 16 and passages 15 for poles 5; a third annular polar sheet of reduced diameter 14 having poles 4, a coil 8, 9, on which is wound an annular stator coil 10, a ring 7 shown as cut and a permanently magnetised rotor 12 keyed on rotor shaft 20.

The tongues 3 and 5 of the polar sheets 1 and 2, respectively, are formed by partial stampings and folding. The same is true for polar sheet 14 which is formed by a stamped piece the tongues of which are formed radially after stamping and are folded to form poles 4.

The coil bearing winding 10, which must be fed by alternating current from a network, has two side flanges 8 and 9 and is introduced into the assembly by the opening in the outer ring 7 which is made of magnetisable material and which, when the motor is assembled, links the two polar sheets 1 and 2.

Inside the central opening of the coil, that is to say inside the axially oriented poles, is located rotor 12 of the motor which is keyed on a shaft 20. This rotor preferably is formed of sintered magnetisable material radially magnetised in such a way as to obtain a number of magnetic poles corresponding to that of the stator poles. Rotor 12 is secured preferably on shaft 20 by means of a plastic mass 13 sunk in the center thereof.

When the motor is assembled, polar sheet 1 is secured directly on the flange 8 of the coil while the other flange 9 thereof is in contact with polar sheet 14 on which rests the short circuiting ring 6 and polar sheet 2 whose poles 5 project through opening 15 of the ring. The two ends of shaft 20 are pivoted in bearings 17 and 18 of plastic material moulded directly in central openings provided in outer polar sheets 1 and 2. This permits to eliminate special flanges for the support of this shaft. Consequently the motor is particularly small and light.

Figure 2:
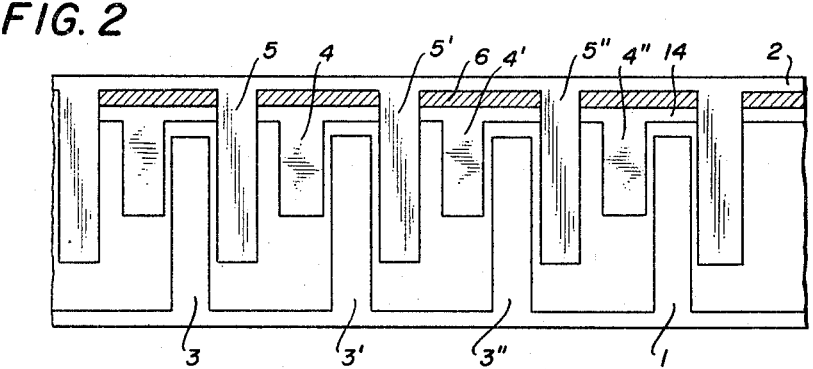
FIGURE 2 is a schematic partial view of the stator poles.

The arrangement of the poles of the motor is shown in FIGURE 2. Between each successive pair of poles 3, 3', 3'', of polar stator sheet 1 the polarity of which is identical from pole to pole, are disposed two poles 4, 5; 4', 5'; 4'', 5'' which are parts of polar sheets 14 and 2 and of opposite polarity to the preceding ones.

Figure 3:
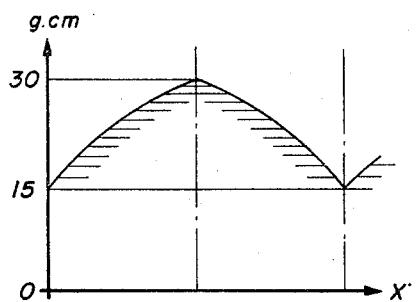
FIGURE 3 is a diagrammatic view showing the variation of the couple generated on the rotor of the motor as a function of its angular displacement.

While poles 3 of sheet 1 and poles 4 of sheet 14 are always simultaneously energised and thus with a flux of the same phase, the energising of poles 5 of sheet 2 occurs with dephasing with respect to the energising of the other poles because of the short circuit ring 6. It can be seen on FIGURE 2 that the poles of sheet 14 have lesser length in the axial direction of the motor than poles 3 and 5; furthermore, the distance between adjacent poles of the same polarity 4, 5; 4', 5'; 4", 5" is selected so as to be greater than the distance between the opposed poles 3, 5 and 4, 3'. As a result of the local asymmetry of the stator field produced by the arrangement of the form of the poles and the asymmetry due to the dephasing of the magnetic field, the moment produced on the rotor is never zero regardless of its angular position. This moment represents a function of the angular displacement schematically shown by FIGURE 3. The magnetic stresses acting on the rotor in opposite directions, attraction and repulsion, never become equal; the arrangement of the members can be selected so that the minimum moment indicated by FIGURE 3 in gram per centimeter never goes below a value corresponding to substantially 50% of the maximum moment.

The above described arrangement together with the selection of a diameter for member 14 which is smaller than that of stator pieces 1 and 2 makes possible to obtain a magnetic equilibrium the role of which is essential for the starting and the correct functioning of the motor. In particular it will be noted that stator piece 14 brings to the rotor a flux additional to stator piece 2 the poles of which 5, 5', 5" distribute a dephased flux under the influence of short circuit ring 6, a flux which is characterized by a reduced intensity as compared with the flux distributed by poles 3, 3', 3", of stator 2, owing precisely to the presence of the ring which is the seat of induced currents resulting in a decrease of flux.

The number of stator poles naturally can be selected as a function of the speed of rotation desired. For example a speed of 500 turns per minute with an alternating current feed of 50 Hz. can be obtained with six pairs of poles as shown in the drawing. The number of poles of the magnetised rotor can be equal to that of the pairs of poles of the stator or a multiple thereof or a given multiple of 2. A motor of the present type fed with a 50 cycle current 220 volts uses only 10 ma. of current; its maximum starting couple for a speed of 1 rotation per minute is greater than 12 cm. per kg. while the couple for a speed of 500 rotations per minute oscillates between 30 cm./g. and 15 cm./g.

What is claimed is:

1. A small synchronous electric motor including a permanently magnetized rotor, a stator comprising an energizing coil surrounding the rotor, a cage of stator poles disposed between the rotor and the coil and projecting on either side along two flanges placed on either side of the coil and connected magnetically by means of a ring surrounding said coil, and along the inner edge of a magnetizable ring independent of said flanges and placed between one of them and the coil, one pole of this flange and one pole of the magnetizable ring being each time placed side by side between two poles of the opposed flange, a short circuiting ring being disposed between the magnetizable ring and the flange near said ring; the distance between neighbouring poles of the same polarity being greater than the distance separating the poles of opposed polarity; the diameter of the magnetizable inner ring being smaller than the diameter of the two flanges in such a way that the magnetic flux passing through the poles of this ring be less than that of the poles of the two flanges.

References Cited

UNITED STATES PATENTS

| 2,017,700 | 10/1935 | Michaelis | 310—172 |
| 2,256,711 | 9/1941 | Hansen et al. | 310—172 |
| 3,330,975 | 7/1967 | Osterwalder | 310—164 |

MILTON O. HIRSHFIELD, *Primary Examiner.*

L. L. SMITH, *Assistant Examiner.*

U.S. Cl. X.R.

310—172